(12) United States Patent
Lee et al.

(10) Patent No.: US 7,507,135 B2
(45) Date of Patent: Mar. 24, 2009

(54) METHOD OF MANUFACTURING FIELD EMITTER

(75) Inventors: Sang-Hyun Lee, Yongin-si (KR); Jeong-Hee Lee, Seongnam-si (KR); Shang-Hyeun Park, Boryeong-si (KR); Tae-Won Jeong, Seoul (KR); Jung-Na Heo, Seoul (KR); Won-Seok Kim, Jeollabuk-do (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 442 days.

(21) Appl. No.: 11/048,809

(22) Filed: Feb. 3, 2005

(65) Prior Publication Data

US 2005/0176336 A1   Aug. 11, 2005

(30) Foreign Application Priority Data

Feb. 5, 2004   (KR) .................... 10-2004-0007524

(51) Int. Cl.
*H01J 9/00* (2006.01)
(52) U.S. Cl. .................... 445/50; 445/49; 445/51; 445/24; 427/77
(58) Field of Classification Search ............. 445/49–51; 449/49; 427/77; 313/309–311
See application file for complete search history.

(56) References Cited

U.S. PATENT DOCUMENTS

| | | | | | |
|---|---|---|---|---|---|
| 3,921,022 | A | * | 11/1975 | Levine | 313/309 |
| 4,392,013 | A | * | 7/1983 | Ohmura et al. | 174/253 |
| 5,536,193 | A | * | 7/1996 | Kumar | 445/50 |
| 5,623,180 | A | * | 4/1997 | Jin et al. | 313/310 |
| 5,948,465 | A | * | 9/1999 | Blanchet-Fincher et al. | 427/77 |
| 6,097,138 | A | * | 8/2000 | Nakamoto | 313/309 |
| 6,239,547 | B1 | * | 5/2001 | Uemura et al. | 313/495 |
| 6,277,318 | B1 | * | 8/2001 | Bower et al. | 977/842 |
| 6,436,221 | B1 | * | 8/2002 | Chang et al. | 445/50 |
| 6,440,761 | B1 | * | 8/2002 | Choi | 313/309 |
| 6,452,328 | B1 | * | 9/2002 | Saito et al. | 313/495 |
| 6,682,383 | B2 | * | 1/2004 | Cho et al. | 445/50 |
| 6,741,019 | B1 | | 5/2004 | Filas et al. | |
| 6,914,372 | B1 | | 7/2005 | Akiyama et al. | |
| 7,147,534 | B2 | * | 12/2006 | Chen et al. | 445/50 |

FOREIGN PATENT DOCUMENTS

| | | | |
|---|---|---|---|
| EP | 1073085 A2 | * | 1/2001 |
| JP | 2001-167692 | | 6/2001 |
| JP | 2001-319560 | | 11/2001 |
| JP | 2003297230 A | * | 10/2003 |

OTHER PUBLICATIONS

Chinese Office action dated Oct. 10, 2008, in corresponding Chinese Patent Application No. 2005100064061.

* cited by examiner

*Primary Examiner*—Mariceli Santiago
(74) *Attorney, Agent, or Firm*—Robert E. Bushnell, Esq.

(57) ABSTRACT

In a method of manufacturing a field emitter, a patterned conductive layer is formed on a substrate, an upper surface of the conductive layer is coated with a mixture of a field emission material and metal powder, the mixture is thermally treated to improve adhesion of the mixture to the conductive layer, and a field emission material and a metal deposited on a portion of the substrate other than the conductive layer are removed. Accordingly, the lifespan and field emission characteristic of the field emitter are greatly improved, and a large area field emitter having excellent characteristics that cannot be realized in the conventional art is fabricated.

19 Claims, 4 Drawing Sheets

METHOD OF MANUFACTURING FIELD EMITTER

CLAIM OF PRIORITY

This application makes reference to, incorporates the same herein, and claims al benefits accruing under 35 U.S.C. §119 from an application earlier filed in the Korean Intellectual Property Office on 5 Feb. 2004 and there duly assigned Serial No. 10-2004-0007524.

BACKGROUND OF THE INVENTION

1. Technical Field

The present invention relates to a method of manufacturing a field emitter, by which method a large field emitter having an excellent adhesion is simply formed on a metal electrode.

2. Description of the Related Art

A conventional field emitter has been used in various fields according to a field emission characteristic and a field emission effect thereof. Particularly, since carbon nanotubes were developed in the early 1990's, much research into the manufacture of field emission displays using a carbon nanotube thin films has been conducted. In a field emitter using carbon nanotubes, carbon-family materials including carbon nanotubes have poor adhesion to a substrate formed of silicon, glass, or the like. Hence, forming a film of carbon-family materials on a substrate is difficult. Even when the film is formed and used as a field emission emitter for a long period of time, the carbon nanotubes may be detached from the substrate due to low adhesion of the film. Hence, manufacturing of a wide field emitter is difficult.

Conventional methods of manufacturing a field emitter of a field emission display using carbon nanotubes can be roughly divided into two methods. A first method involves growing carbon nanotubes from a substrate, and a second method involves mechanically forming carbon nanotubes on a substrate by pasting the substrate with grown carbon nanotubes. These conventional methods have the following problems. When the first method is used, formation of a wide field emitter is substantially difficult because adhesion to a silicon substrate, a glass substrate, an indium tin oxide (ITO) substrate, etc. is poor. Hence, much research into the manufacturing of a wide field emitter is required.

When the second method is used, many impurities, such as, a binder, a resin, a filter, or the like, are included in the carbon nanotubes. The impurities adversely affect field emission by the carbon nanotubes, and have a bad influence upon the durability and stability of the field emitter. While mechanical polishing, such as milling, is performed, many defects are detected. As a result, the life span of the field emitter is short.

When materials other than carbon nanotubes are used as field emission materials, they also may have low adhesion to a lower substrate or an electrode. The low adhesion of the field emission materials directly affects the performance and durability of the field emission display.

SUMMARY OF THE INVENTION

The present invention provides a method of manufacturing a large-area carbon nanotube field emitter, by which method adhesion between a field emission material, such as carbon nanotubes, and an electrode is improved, and the durability and field emission of the field emitter are also improved.

According to an aspect of the present invention, a method of manufacturing a field emitter includes the steps of: forming a patterned conductive layer on a substrate; coating an upper surface of the conductive layer with a mixture of a field emission material and metal powder; thermally treating the mixture to improve an adhesion of the mixture to the conductive layer; and removing a field emission material and a metal deposited on a portion other than the conductive layer.

The field emission material may be a carbon-family material, a metal or a semiconductor material. The carbon-family material may include at least one of carbon nanotubes and a carbon horn.

The step of forming the patterned conductive layer includes: forming a photoresist layer so as to expose a predetermined upper area of the substrate; coating the exposed upper area of the substrate and an upper surface of the photoresist layer with a conductive material; and forming a conductive layer by removing the photoresist layer and a conductive material deposited on the photoresist layer.

The steps of coating the upper surface of the conductive layer with the mixture and thermally treating the mixture include: coating an exposed portion of the substrate and the conductive layer with a mixture of the field emission material, the metal powder and a suitable solvent at a predetermined ratio; and thermally treating the mixture at a temperature of about 600° C. so as to increase adhesion between the mixture and the conductive layer.

The metal powder may be silver, copper, zinc or nickel.

The diameter of the metal powder may be about 0.01 to 100 μm.

The mixture of the field emission material, the metal powder, and the solvent may be coated on the exposed portion of the substrate and the conductive layer using spin coating or printing.

The substrate may be a silicon substrate, a glass substrate, or an indium tin oxide substrate.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1A:
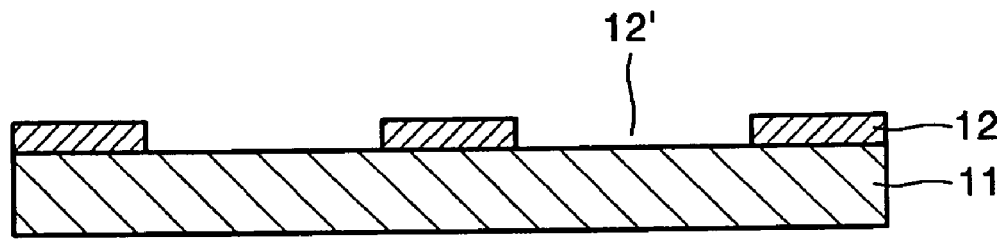
FIGS. 1A through 1G are cross-sectional views illustrating a method of manufacturing a field emitter according to an embodiment of the present invention.

FIGS. 1A through 1G are cross-sectional views illustrating a method of manufacturing a field emitter according to an embodiment of the present invention. Referring to FIG. 1A, first, a patterned photoresist (PR) layer 12 is formed on a substrate 11 and is exposed and patterned to form grooves 12', each having a predetermined width. The grooves 12' indicate locations where a field emission material is formed. Depending on a desired size, each of the grooves 12' has a predetermined shape. This process is not necessary for formation of a single field emitter but is necessary for formation of a plurality of field emitters on a single substrate so as to manufacture a field emitter array for mass production of field emitters. The type of substrate 11 used is not limited, so that a glass substrate, a light-transmissive indium tin oxide (ITO) substrate or the like may be used as the substrate 11.

Figure 1B:
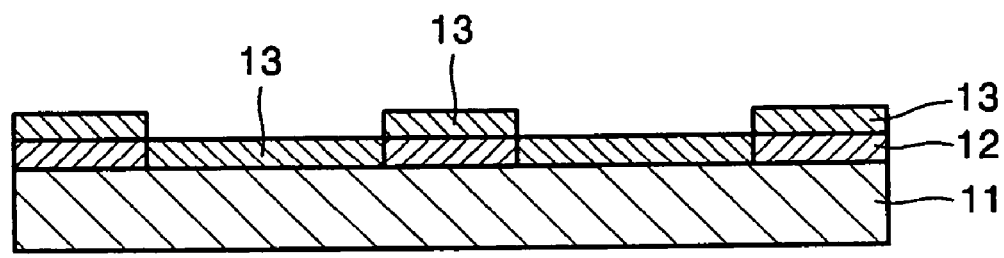
Figure 1C:
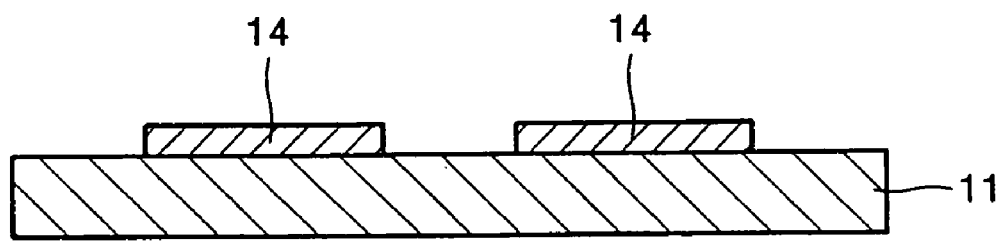

Thereafter, referring to FIG. 1B, a conductive material 13 is disposed on the PR layer 12 and the substrate 11 so as to form an electrode and so that a potential can be applied to a field emission material. Generally, a metal capable of being used as an electrode in a semiconductor device is deposited on the PR layer 12 and the substrate 11. Any deposition method used in a general semiconductor manufacturing process may be used to deposit the conductive material 13. Particularly, when the conductive material 13 is a metal, a vapor deposition method, such as sputtering, ion beam deposition or evaporation, is used. Hence, the conductive material 13 is deposited on the patterned PR layer 12 and the grooves 12' so as to form a stepped surface. Then, as illustrated in FIG. 1C, the PR layer 12 and the contuctive material 13 are removed so that a conductive layer 14 remains on the substrate 11.

Figure 1D:
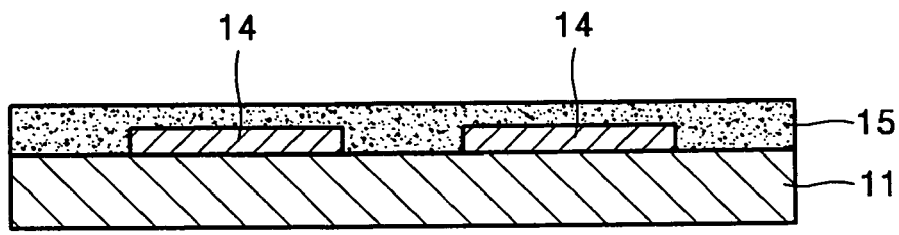

As illustrated in FIG. 1D, a field emission material and metal nano powder are mixed at a desired ratio to form a mixture, and an exposed portion of the substrate 11 and the conductive layer 14 are coated with the mixture using spin coating or screen printing such that the mixture has a desired thickness. When a carbon-family material, such as, carbon nanotubes, is used as the field emission material, a necessary solvent is also mixed with the mixture. Consequently, a mixture layer 15, composed of the field emission material and the metal nano powder, is formed on the exposed portion of the substrate 11 and the conductive layer 14.

The metal nano power is used to increase an adhesion between the conductive layer 14 and the field emission material, so that a conductive fine powder is used as the metal nano powder. Typically, metal nano powder having a size of a submicron to several microns (about 0.01 to 100 µm) is used, and may include several metal powders, such as Ag, Cu, Zn, Ni and the like, having low melting points. The field emission material may be a carbon-family material, a metal, a semiconductor material, or the like. The carbon-family material may be carbon nanotubes, a carbon horn, or the like. The metal may be tungsten. The semiconductor material may be Si. Palladium oxide (PLO) may also be used as the field emission material. Any material used as a general field emission material may be used as the field emission material according to an embodiment of the present invention.

Figure 1E:
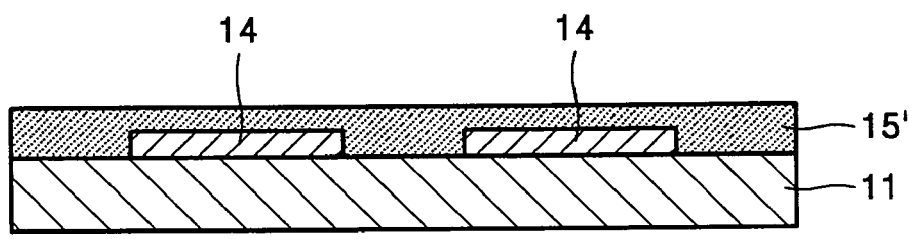

As illustrated in FIG. 1E, the mixture layer 15 formed of the field emission material and the metal nano powder on the conductive layer 14 undergoes thermal treatment. When a solvent is included in the mixture layer 15, the solvent usually has a boiling point lower than a temperature for thermal treatment. For example, alcohol having a boiling point lower than the temperature for thermal treatment is preferably used as the solvent. When ITO is used to form the substrate 11, the thermal treatment is preferably performed at no more than 600° C., and a material having a boiling point lower than this temperature is preferably used as the solvent. When carbon nanotubes are used as the field emission material, most of the typically used solvents may be used as the solvent. When the mixture layer 15 undergoes such thermal treatment, the metal and the field emission material excluding the solvent remain on the exposed portion of the substrate 11 and the conductive layer 14. The remaining metal adheres to the conductive layer 14 due to the thermal treatment, and the remaining field emission material sticks to the metal. Consequently, the remaining field emission material and the remaining metal form a mixture layer 15'.

Figure 1G:
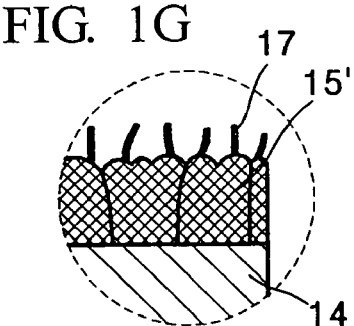
Figure 1F:
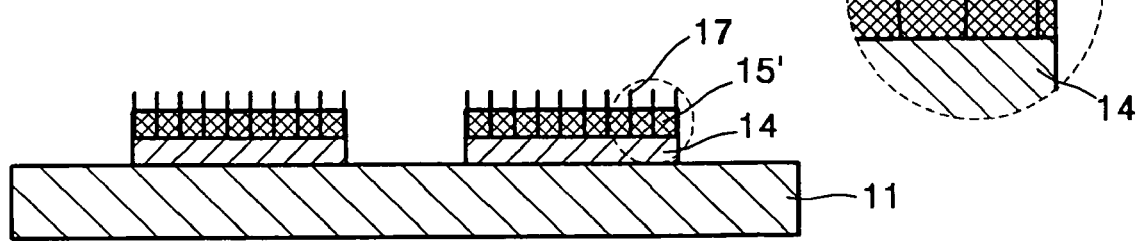

As illustrated in FIG. 1F and FIG. 1G, the mixture layer 15' formed on the substrate 11 and the conductive layer 14 undergoes surface processing. The surface processing may be performed using a typically used method, and may use ultrasonic waves or an adhesive tape. Even when just an adhesive tape is used, the mixture layer 15' formed on the conductive layer 14 has excellent adhesion to the conductive layer 14. Thus, during this surface processing, only a portion of the mixture layer 15' that contacts the surface 11 is removed. The metal adheres to the conductive layer 14 due to the thermal treatment, and fixes the field emission material, which is mixed with the metal. Hence, referring to FIG. 1F and FIG. 1G, a plurality of protrusions 17 of the field emission material are formed on the mixture layer 15' remaining after the thermal treatment. Consequently, the field emitter according to an embodiment of the present invention can be completely formed.

Figure 2A:
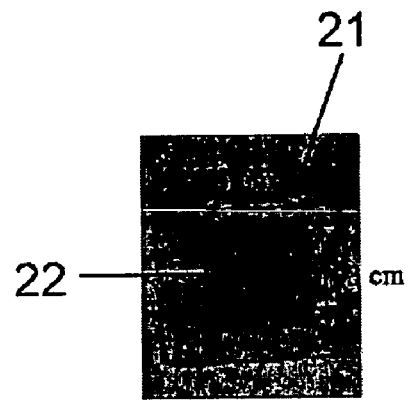
FIGS. 2A and 2B are pictures of a field emitter which is fabricated using carbon nanotubes as a field emission material in a method according to an embodiment of the present invention.
Figure 2B:
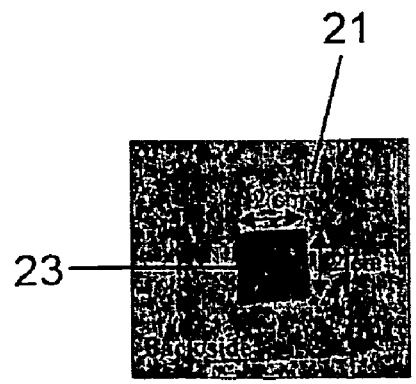

FIGS. 2A and 2B are pictures of a field emitter which is fabricated using carbon nanotubes as a field emission material in a method according to an embodiment of the present invention. In FIG. 2A, a conductive layer of a desired size is formed on a substrate 21, and a mixture layer 22 composed of carbon nanotubes and metal nano powder is deposited on the conductive layer using spin coating or screen printing. The substrate 21 is formed of ITO, and the metal nano powder is formed of Ag. The conductive layer has a 2×2 cm size, and the mixture layer 22 is deposited on the conductive layer to have a 3×3 cm size.

FIG. 2B illustrates a specimen obtained by removing a solvent from a specimen of FIG. 2A using thermal treatment, and by performing surface processing on the specimen of FIG. 2A. Referring to FIG. 2A, when the mixture layer 22 formed on the substrate 21 undergoes surface processing, only a mixture layer 23 of 2×2 cm size adhering to an upper surface of the conductive layer remains on the substrate 21. In other words, a portion of the mixture layer 22 excluding the mixture layer 23 of 2×2 cm size is removed by thermal treatment. This means that adhesion between the conductive layer and carbon nanotubes is significantly greater than adhesion between the substrate 21 and carbon nanotubes as described above.

Figure 3A:
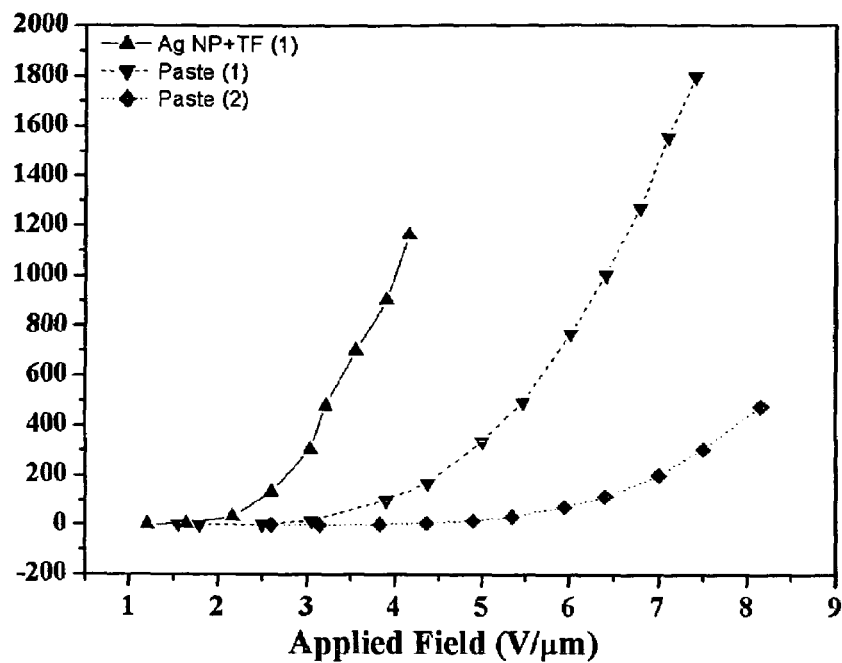
FIG. 3A is a graph showing emitted fields of conventional field emitters that use carbon nanotubes as field emission materials, and an emitted field of a field emitter according to an embodiment of the present invention that uses carbon nanotubes as a field emission material, versus an applied voltage.
Figure 3B:
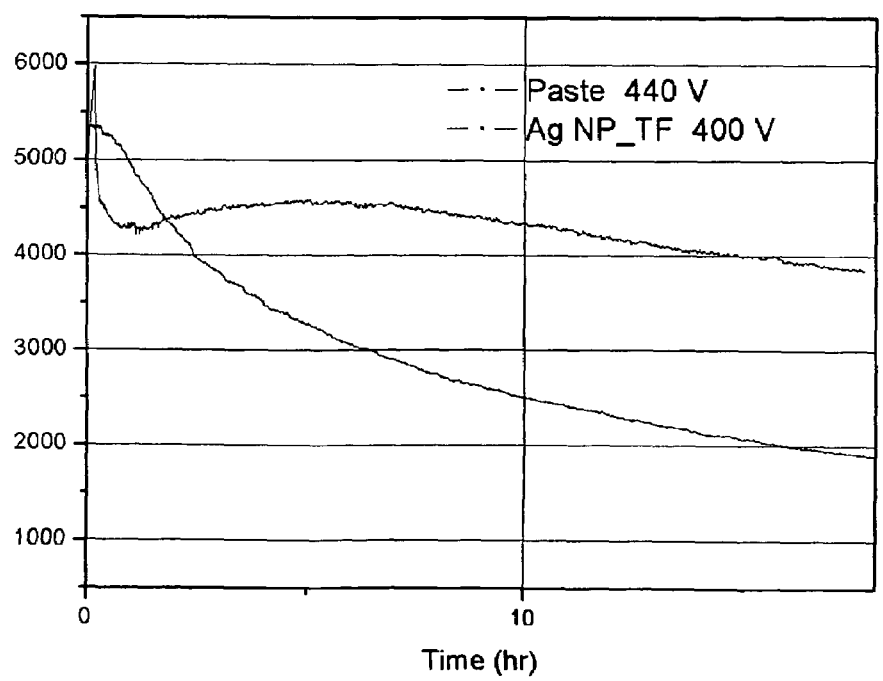
FIG. 3B is a graph showing emitted fields of a conventional field emitter that use carbon nanotubes, and a field emitter according to an embodiment of the present invention that use carbon nanotubes, versus time.

FIGS. 3A and 3B are graphs showing measured electrical characteristics of a field emitter which uses carbon nanotubes as a field emission material, according to an embodiment of the present invention. Referring to FIG. 3A, when an identical potential is applied, the field emitter according to an embodiment of the present invention has greater field emission than conventional field emitters, namely, paste (1) and paste (2), that use carbon nanotubes as field emission materials. When a potential of 4 V/µm is applied, the field emitter according to the embodiment of the present invention emits a field of about 1200 µA/cm$^2$, whereas the conventional field emitters emit a field of no more than 200 µA/cm$^2$. In other words, when a field emitter is fabricated using a carbon nanotube paste as in the conventional art, many impurities, such as a binder material, a resin, a filter and the like, are included in the field emitter and adversely affect the field emission of the field emitter.

FIG. 3B is a graph showing field emission characteristics of field emitters versus a time during which the field emitters are used. Referring to FIG. 3B, the size of a conventional field emitter continuously decreases according to the period of time during which the conventional field emitter is used. On the other hand, the field emitter according to an embodiment of the present invention emits a small field that does not greatly vary according to the period of time during which the field emitter is used.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A method of manufacturing a field emitter, the method comprising the steps of:
    forming a patterned conductive layer on a substrate;
    coating an exposed portion of the substrate and an upper surface of the patterned conductive layer with a mixture of a field emission material and metal powder;
    thermally treating the mixture to improve adhesion of the mixture to the patterned conductive layer; and
    removing a field emission material and a metal deposited on a portion of the substrate other than the patterned conductive layer;
    wherein the step of forming the patterned conductive layer comprises:
        forming a photoresist layer so as to expose an upper area of the substrate;
        coating the exposed upper area of the substrate and an upper surface of the photoresist layer with a conductive material; and
        forming a conductive layer by removing the photoresist layer and the conductive material coated on the photoresist; and
    wherein the step of thermally treating the mixture layer comprises thermally treating the mixture layer at a temperature of substantially 600° C. to increase adhesion between the mixture layer and the conductive layer.

2. The method of claim 1, wherein the field emission material is selected from a group consisting of a carbon-family material, a metal and a semiconductor material.

3. The method of claim 2, wherein the carbon-family material comprises at least one of carbon nanotubes and a carbon horn.

4. The method of claim 1, wherein the step of coating the exposed portion of the substrate and the upper surface of the conductive layer with the mixture comprises:
    coating the exposed portion of the substrate and the upper surface of the conductive layer with a mixture at a predetermined ratio of the field emission material, the metal powder, and a suitable solvent.

5. The method of claim 4, wherein the metal powder is one of silver, copper, zinc and nickel.

6. The method of claim 4, wherein a diameter of the metal powder is in a range of 0.01 μm to 100 μm.

7. The method of claim 4, wherein the mixture of the field emission material, the metal powder and the solvent is coated on the exposed portion of the substrate and the conductive layer using one of spin coating and printing.

8. The method of claim 1, wherein the substrate is one of a silicon substrate, a glass substrate and an indium tin oxide substrate.

9. A method of manufacturing a field emitter, the method comprising the steps of:
    forming a patterned conductive layer on a substrate;
    coating an exposed portion of the substrate and an upper surface of the patterned conductive layer with a mixture of a field emission material and metal powder;
    thermally treating the mixture to improve adhesion of the mixture to the patterned conductive layer; and
    removing a field emission material and a metal deposited on a portion of the substrate other than the patterned conductive layer;
    wherein the step of thermally treating the mixture comprises thermally treating the mixture at a temperature of substantially 600° C. to increase adhesion between the mixture and the conductive layer.

10. The method of claim 9, wherein the mixture is thermally treated at a temperature no greater than 600° C.

11. A method of manufacturing a field emitter array, the method comprising the steps of:
    forming a patterned photoresist (PR) layer on a substrate;
    exposing and patterning the PR layer to form grooves, each having a predetermined width;
    depositing a conductive material on the patterned PR layer and in the grooves so as to form a stepped surface, with a conductive layer remaining on the substrate;
    coating an exposed portion of the substrate and the conductive layer with a mixture of a field emission material and metal so as to form a mixture layer on the conductive layer and the substrate;
    thermally treating the mixture layer so that the field emission material and the metal remain on the exposed portion of the substrate and the conductive layer to form a further mixture layer; and
    surface processing the further mixture layer and the conductive layer so as to remove only a portion of the further mixture layer in contact with the substrate;
    wherein the step of thermally treating the mixture layer comprises thermally treating the mixture layer at a temperature of substantially 600° C. to increase adhesion between the mixture layer and the conductive layer.

12. The method of claim 11, wherein the field emission material is selected from a group consisting of a carbon-family material, a metal and a semiconductor material.

13. The method of claim 12, wherein the carbon-family material comprises at least one of carbon nanotubes and a carbon horn.

14. The method of claim 11, wherein the step of coating the exposed portion of the substrate and the conductive layer with the mixture comprises:
    coating the exposed portion of the substrate and the conductive layer with a mixture at a predetermined ratio of the field emission material, the metal, and a suitable solvent.

15. The method of claim 14, wherein the metal is one of silver, copper, zinc and nickel.

16. The method of claim 14, wherein the metal is a metal powder having a diameter in a range of 0.01 μm to 100 μm.

17. The method of claim 14, wherein the mixture of the field emission material, the metal and the solvent is coated on the exposed portion of the substrate and the conductive layer using one of spin coating and printing.

18. The method of claim 11, wherein the mixture layer is thermally treated at a temperature no greater than 600° C.

19. The method of claim 11, wherein the substrate is one of a silicon substrate, a glass substrate and an indium tin oxide substrate.

* * * * *